(12) United States Patent
Smallhorn

(10) Patent No.: US 7,143,978 B2
(45) Date of Patent: Dec. 5, 2006

(54) IN-SEAT POWER SUPPLY FLOOR MODULE

(75) Inventor: George R. Smallhorn, Montreal (CA)

(73) Assignee: Inflight Investments Inc. (CA)

( * ) Notice: Subject to any disclaimer, the term of this patent is extended or adjusted under 35 U.S.C. 154(b) by 83 days.

(21) Appl. No.: 10/921,124

(22) Filed: Aug. 19, 2004

(65) Prior Publication Data
US 2005/0040289 A1 Feb. 24, 2005

(51) Int. Cl.
*B64D 11/00* (2006.01)
(52) U.S. Cl. .................. 244/118.5; 297/217.3
(58) Field of Classification Search ............ 244/118.5, 244/118.6; 297/217.3
See application file for complete search history.

(56) References Cited

U.S. PATENT DOCUMENTS

| | | | | |
|---|---|---|---|---|
| 4,853,555 | A | * | 8/1989 | Wheat ........................ 307/9.1 |
| 5,409,186 | A | * | 4/1995 | Chow ...................... 244/122 R |
| 5,795,018 | A | | 8/1998 | Schumacher et al. |
| 6,601,798 | B1 | * | 8/2003 | Cawley ................... 244/118.6 |
| 6,619,588 | B1 | * | 9/2003 | Lambiaso ................ 244/118.5 |
| 6,644,593 | B1 | * | 11/2003 | Lambiaso ................ 244/118.5 |
| 6,743,976 | B1 | | 6/2004 | Motzigkeit |
| 6,824,104 | B1 | * | 11/2004 | Smallhorn ............... 244/118.5 |
| 6,863,344 | B1 | * | 3/2005 | Smallhorn ............... 297/217.3 |
| 2003/0111880 | A1 | | 6/2003 | Lamblaso |

FOREIGN PATENT DOCUMENTS

GB 2 354 990 11/2001

* cited by examiner

*Primary Examiner*—Tien Dinh
(74) *Attorney, Agent, or Firm*—Ogilvy Renault LLP; Paul J. Field

(57) ABSTRACT

The invention provides an electrical power supply for mounting to floor tracks adjacent an aircraft passenger cabin seat assembly, the seat assembly having at least one passenger seat supported on legs secured to the floor tracks, the electrical power supply including: a housing having an interior chamber and a base plate with floor track mounting fasteners; an electrical power supply unit within the chamber having an inlet connector for communication with an aircraft electrical power source; and at least one electrical power outlet mounted to an exterior surface of the housing and in communication with the electrical power supply unit.

8 Claims, 2 Drawing Sheets

IN-SEAT POWER SUPPLY FLOOR MODULE

TECHNICAL FIELD

The invention relates to an aircraft seat mounted housing to provide passenger electric power supply for passenger operated devices.

BACKGROUND OF THE ART

A component of passenger aircraft cabin services is the provision of electric power for operating laptop computers and personal entertainment devices. To improve service, airlines may provide various passenger operated services such as portable CD and DVD players that require electrical power supply. As well laptop computers and personal electronic devices require electric power since on long flights, battery power is insufficient or unreliable.

It is an object of the invention to provide electric power to aircraft passenger seats without requiring modification to the seats themselves that would effect the structure or safety approval of the seats.

Further objects of the invention will be apparent from review of the disclosure, drawings and description of the invention below.

DISCLOSURE OF THE INVENTION

The invention provides an electrical power supply for mounting to floor tracks adjacent an aircraft passenger cabin seat assembly, the seat assembly having at least one passenger seat supported on legs secured to the floor tracks, the electrical power supply comprising: a housing having an interior chamber and a base plate with floor track mounting fasteners; an electrical power supply unit within the chamber having an inlet connector for communication with an aircraft electrical power source; and at least one electrical power outlet mounted to an exterior surface of the housing and in communication with the electrical power supply unit.

In the example illustrated in the accompanying drawings the in-seat power supply floor module system provides a three passenger seats with three electrical power outlets within an aircraft passenger cabin. The module includes a housing mounted to the seat floor tracks beneath an aircraft seat, between seat legs and aft a baggage bar. The housing includes ventilation holes, a power supply and electric power outlets mounted on a hinged access door for ease of maintenance and inspection. Preferably the housing also includes a remote power-in-use indicator display mounted on the baggage bar of the seat adjacent an aisle.

Further details of the invention and its advantages will be apparent from the detailed description included below.

DETAILED DESCRIPTION OF PREFERRED EMBODIMENTS

Figure 1:
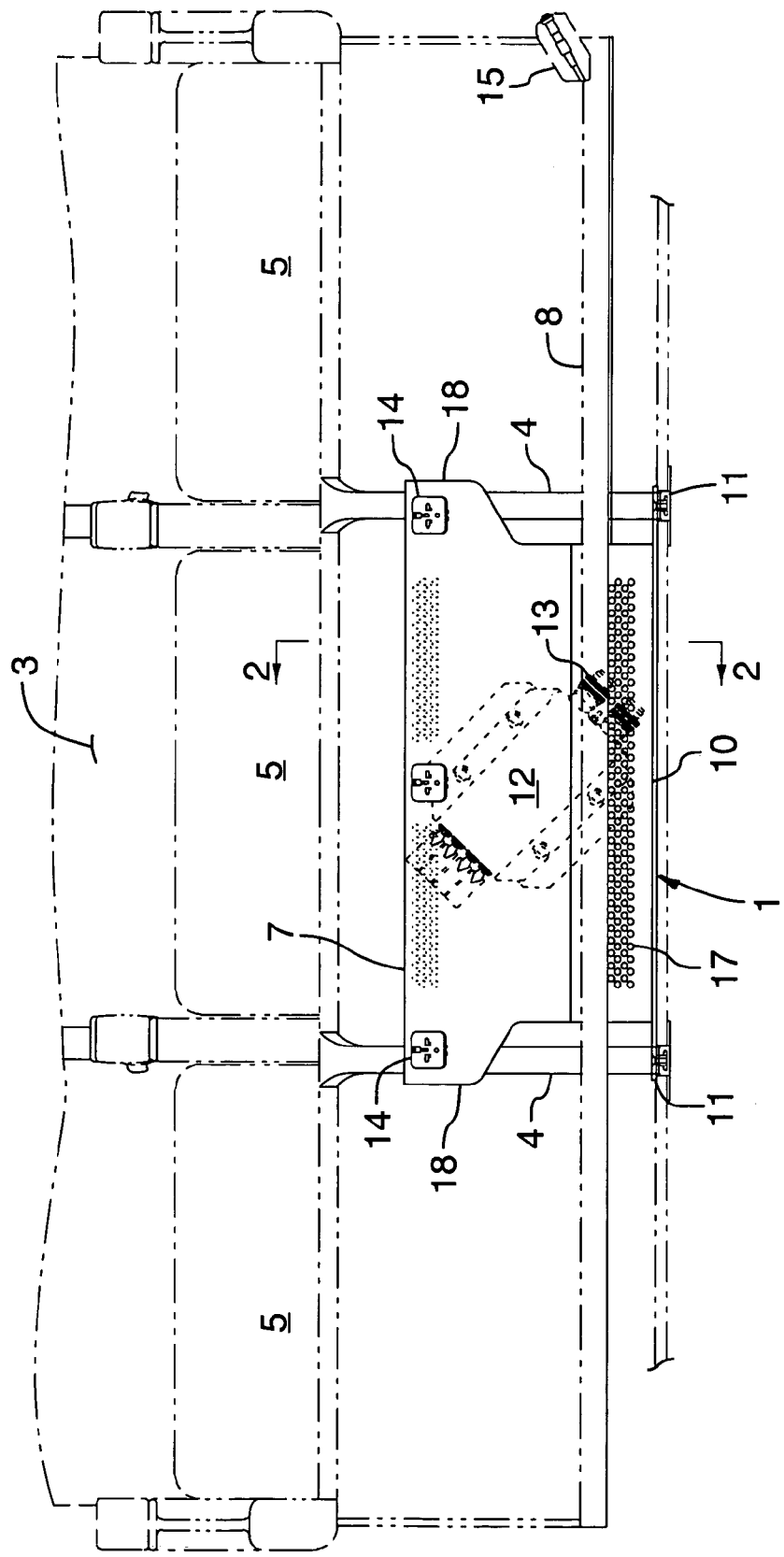
FIG. 1 shows an aft looking elevation view of a typical passenger aircraft three seat assembly with centrally mounted housing, three outlets and internal power supply mounted to the passenger cabin floor seat mounting tracks.
Figure 2:
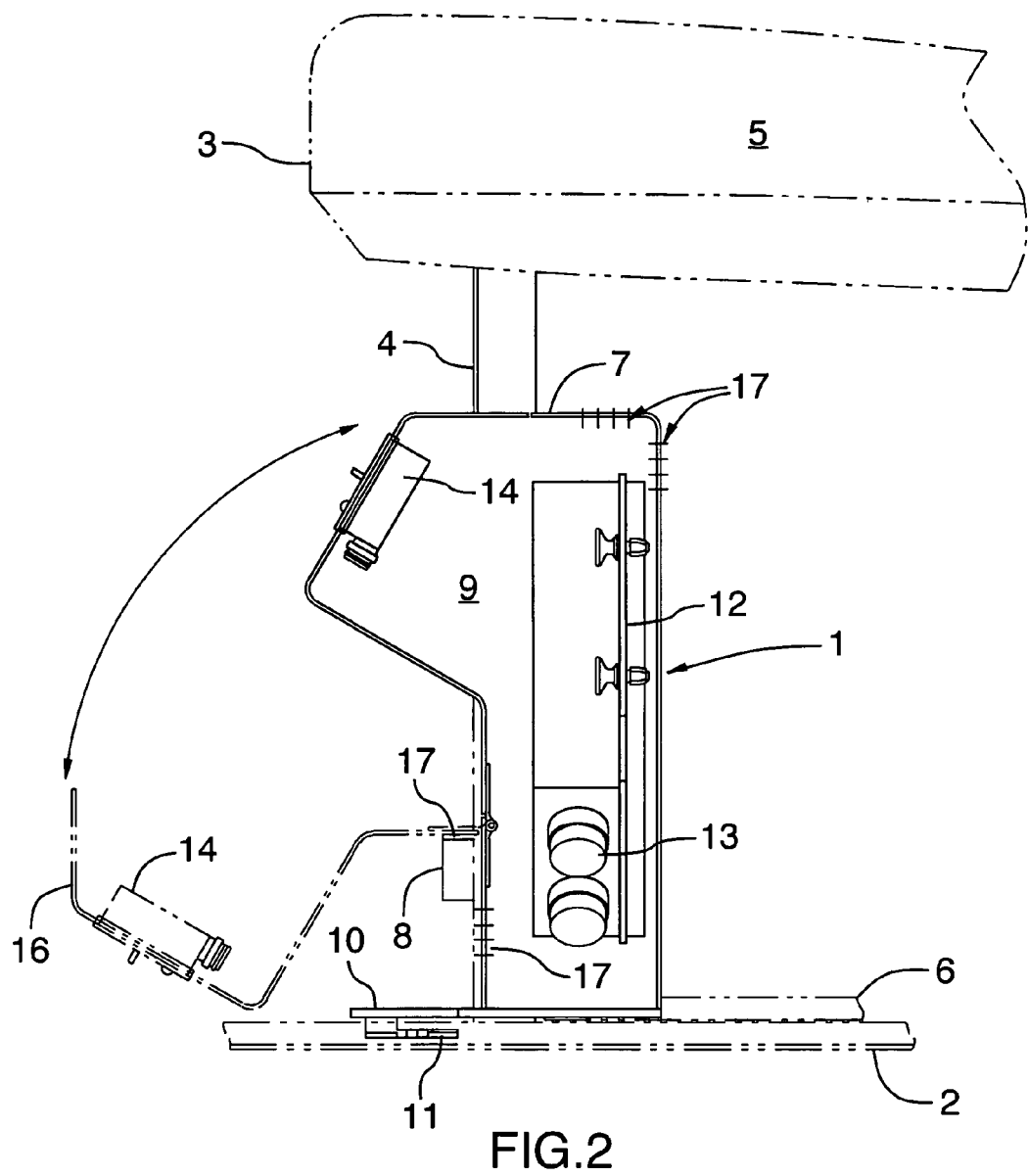
FIG. 2 shows a sectional view of the housing and seat along line 2—2 of FIG. 1.

FIGS. 1 and 2 show an electrical power supply 1 mounted to the floor tracks 2 in the floor of an aircraft passenger cabin adjacent to aircraft passenger seat assembly 3 having three passenger seats supported on two forward seat legs 4, in the illustrated example. The passenger seats 5 are rigidly supported on the legs 4 fixed to a slidable seat rail 6 that is removably attached to the floor tracks 2 in a known manner.

In the embodiment illustrated, the electrical power supply 1 includes a housing 7 adapted for mounting beneath the passenger seats 5 and between two adjacent seat legs 4.

The housing 7 may be adapted from mounting aft of the seat baggage bar 8 to further mechanically restrain the housing 7, to avoid interference with use of the passenger's seat and to occupy a portion of the readily available space under the seat designated for carry-on luggage.

As best seen in FIG. 2, the housing 7 includes an interior chamber 9 and includes a base plate 10. In the example illustrated, the base plate 10 includes laterally extending fastener supporting tabs 11 for mounting in the floor tracks 2 with floor track fasteners. Within the chamber 9, there is an electrical power supply unit 12 having an inlet connector 13 for communication with the aircraft electrical power sources. In the embodiment illustrated, three separate electrical power outlets 14 are mounted to the exterior surface of the housing 7 and communicate with the electrical power supply unit 12 within the chamber 9.

As shown in FIG. 1, preferably the power supply 1 includes a power-in-use indicator light 15 adapted for mounting adjacent an aisle side of the seat assembly 3 preferably on the baggage restraint bar 8.

As best seen in FIG. 2, a removable access cover 16 is disposed over an access opening in the housing 7 in a closed position and can be withdrawn from the access opening to provide access to the chamber 9 in an open position. For ease of access during maintenance and inspection, the power outlets 14 are mounted to a top portion of the access cover 16. However other locations for the outlets 14 are within the ambit of the invention. The access cover 16 is hinged to open downwardly from the access opening. Preferably the baggage bar 8 includes a fastener 17 such as hook and loop (Velcro™) fasteners to keep the access cover 16 secured during maintenance and inspection in a downward position as shown in FIG. 2.

As best seen in FIG. 1 the housing 7 includes a laterally extending outlet supporting wings 18 which enable the mounting of the power outlets 14 in a convenient accessible location for use by adjacent passengers. In this manner the housing 7 can easily support use by all three passengers from a single housing 7, eliminating the need for individual housings or supports for each passenger. To dissipate any heat generated by the power supply unit 12, ventilation holes 19 are provided within the housing 7.

Although the above description relates to a specific preferred embodiment as presently contemplated by the inventor, it will be understood that the invention in its broad aspect includes mechanical and functional equivalents of the elements described herein.

I claim:

1. An electrical power supply for mounting to floor tracks adjacent an aircraft passenger cabin seat assembly, the seat assembly having at least one passenger seat supported on legs secured to the floor tracks, the electrical power supply comprising:

a housing having an interior chamber and a base plate with floor track mounting fasteners wherein the housing is adapted for mounting beneath the passenger seat, between two adjacent seat legs, and aft of a seat baggage bar;

an electrical power supply unit within the chamber having an inlet connector for communication with an aircraft electrical power source; and at least one electrical power outlet mounted to an exterior surface of the housing and in communication with the electrical power supply unit.

2. An electrical power supply according to claim 1 including a power-in-use indicator light adapted for mounting adjacent an aisle side of the seat assembly.

3. An electrical power supply according to claim 1 including a removable access cover disposed over an access opening in the housing in a closed position and withdrawn from the access opening to provide access to the chamber in an open position.

4. An electrical power supply according to claim 3 wherein the at least one electrical power outlet is mounted to the access cover.

5. An electrical power supply according to claim 3 wherein the access cover is hinged to open downwardly from the access opening.

6. An electrical power supply according to claim 1 including laterally extending fastener supporting tabs from the base plate.

7. An electrical power supply according to claim 1 wherein the housing includes laterally extending outlet supporting wings.

8. An electrical power supply according to claim 1 wherein the housing includes air ventilation holes.

* * * * *